June 12, 1951  F. R. SWANSON  2,556,988
FASTENER DEVICE
Original Filed Dec. 21, 1946
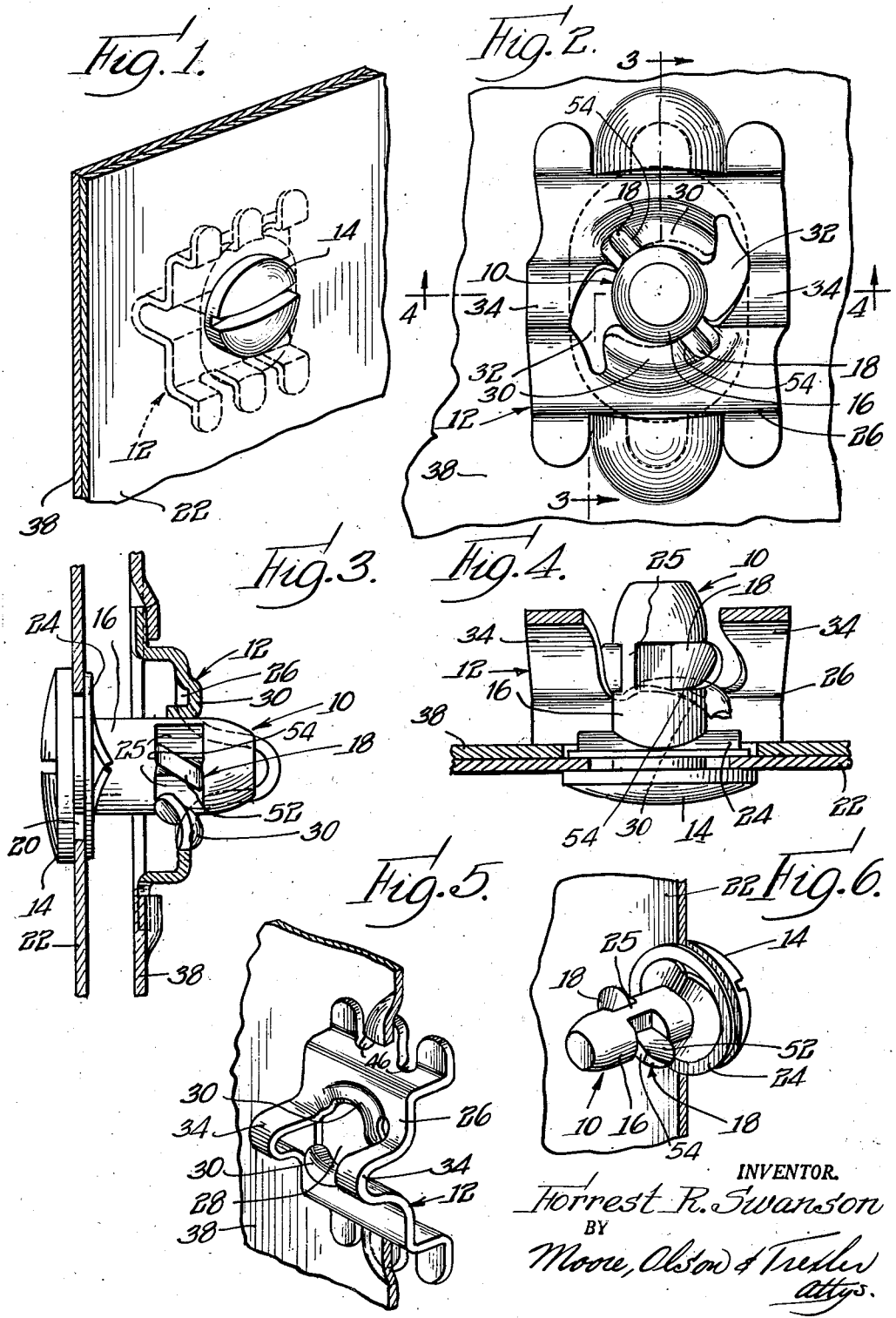
INVENTOR.
Forrest R. Swanson
BY
Moore, Olson & Tresher
attys.

Patented June 12, 1951

2,556,988

UNITED STATES PATENT OFFICE 2,556,988

FASTENER DEVICE

Forrest R. Swanson, Chicago, Ill., assignor to Illinois Tool Works, Chicago, Ill., a corporation of Illinois Original application December 21, 1946, Serial No. 717,787, now Patent No. 2,504,358, dated April 18, 1950. Divided and this application July 13, 1948, Serial No. 38,379

2 Claims. (Cl. 24—221)

The present invention relates in general to quickly operable fasteners for detachably securing panels or work parts together. More particularly, the invention relates to fasteners of the type wherein a stud having integrally formed lug means is employed to clamp work pieces together, such, for example, as metallic sheets.

The present application is a division of applicant's application Serial No. 717,787, filed December 21, 1946, which has since issued into Patent No. 2,504,358, dated April 18, 1950.

One of the objects of the invention is to provide a stud of the type described which is of extremely simple, unitary construction and which may be manufactured very economically.

Another object of the invention is to provide a stud of the above described type wherein the lug means on the stud member is formed integrally therewith by extruding circumferentially spaced portions of the stud shank.

A further object of the invention is to provide a stud of the type described, wherein the laterally extending lugs of the stud member are extruded from the shank body and have inclined cam surfaces which facilitate clamping action as an incident to stud rotation.

These and other objects of the invention will best be understood upon consideration of the following specification and the accompanying drawing, wherein:

Fig. 1 is a perspective view showing portions of two work parts clamped to each other by means of a fastener constructed in accordance with the principles of the present invention, as viewed from the normally exposed side of the work;

Fig. 2 is an elevational view of the work parts and fastener shown in Fig. 1, as viewed from the normally concealed side of the work;

Fig. 3 is a longitudinal sectional view through the fastener and work parts, taken along the line 3—3 of Fig. 2, with the stud shown in its initial position prior to the clamping engagement of the stud lugs with the work parts;

Fig. 4 is a transverse sectional view through the fastener and work sheets, taken along the line 4—4 of Fig. 2;

Fig. 5 is a fragmentary perspective view showing a locking plate mounted to a work part; and Fig. 6 is a fragmentary perspective view showing the stud rotatably mounted in a work part in readiness to accommodate a second work part or sheet.

Referring now to the drawing more in detail it will be seen that the fastener contemplated by the present invention comprises a rotatable stud 10, which is generally secured to a removable panel or work part, such as 22. The stud 10 is adapted to cooperate with a receptacle or resilient locking member 12, which is usually attached to a fixed panel or work part such as 38. The stud 10 comprises a head 14, which may be slotted or otherwise adapted to be engaged by a screw driver or wrench, a shank 16 and laterally extending integral lugs or wings 18. The shank 16 extends through an aperture 20 in the work sheet 22 to which the stud 10 may be secured against axial separation by a retaining washer 24.

The lugs 18 are integral portions of the stud 10 and are formed or extruded from the shank 16 by stamping or forging. This may be accomplished by the use of dies having separated swaging elements, each pair of which engages the shank so as to push or extrude the metal radially outward as the dies are moved toward each other. The separation provided between the swaging elements of the die results in a web portion 25. The die faces may be parallel or inclined to the axis of the shank 16. In the first instance, the lugs 18 may be twisted or inclined relative to the shank in an operation subsequent to the stamping or forging operation, while in the latter case the desired inclination or pitch of the lugs 18 may be obtained during the original stamping or forging operation.

The receptacle or resilient locking part 12, which the lugs 18 of stud 10 lockingly engage, is not claimed as part of the present invention but is disclosed for the purpose of clarity in description. It should be noted that this complementary locking part 12 may be integral with one of the work parts or it may comprise a separate member as herein disclosed.

The locking member 12 of the fastener comprises a plate or section 26 having a stud receiving aperture 28 (Fig. 5) about the periphery of which there is formed a pair of surfaces 30 adapted to engage the laterally extending lugs 18 of the stud 10. The plate 26 is furthermore provided with a pair of opposed recesses 32 (Fig. 2) to accommodate the lugs 18. A transversely extending U-shaped channel which extends abruptly out of the plane of plate 26 may be formed in the center of the locking plate 26, to provide a pair of abutment portions 34. These serve as stops to limit the clockwise rotation of the stud 10, as viewed in Fig. 1.

By providing inclined lugs as above described, a cam surface 52 is presented which is adapted to clampingly engage the raised surface of the receptacle 12, and in instances where no receptacle is employed, to engage the work surface directly. The degree of inclination or pitch of the lugs will be dependent upon the environment in which it is to be used. If considerable axial flexing of the work part or receptacle is to take place, the inclination would be correspondingly greater.

From the foregoing it will be apparent that the invention contemplates a new and improved stud construction. The formation of the lugs 18 from the material of the stud shank provides a very strong, yet simple, structure and reduces to a minimum the cost of manufacture. By providing the extruded lugs with inclined or helical surfaces, the ease with which the lug may be used is greatly facilitated. In other words, the extruded lugs or wings provide inclined cam surfaces which serve to clamp the work pieces in position when partial rotation in a tightening direction is imparted to the stud. The lugs are formed from shank stock extruded from circumferentially spaced areas and providing work clamping edge surfaces 54 which directly engage and clamp the work piece in assembled position, these clamping edge surfaces projecting radially outwardly of the shank and being illustrated as substantially straight. Material from these areas combines to provide an unusually rigid lug or wing which is shaped accurately and which incorporates the proper pitch or inclination to adapt it for its intended use.

The subject matter disclosed herein, but not covered by the claims of this application, is covered by the claims of applicant's above mentioned Patent No. 2,504,358 which issued from a copending application.

While a particular embodiment of the invention has been disclosed and described by way of illustration, it should be apparent that various modifications may be made therein without departing from the spirit of the invention in its broader aspects and scope of the appended claims.

The invention is hereby claimed as follows:

1. A rotatable stud fastener for securing work pieces together and comprising a shank having a relatively narrow transverse web extending axially along the central longitudinal axis thereof and intermediate the ends thereof, radial lugs extruded from the material of said shank on opposite sides of said web and projecting outwardly from said web beyond the periphery of said shank, the projecting ends of each of said lugs having a work engaging cam surface along a face thereof inclined with respect to an axial plane of the shank including said lugs and having a radial work clamping edge surface extending radially outwardly from the periphery of said shank and substantially normal to the shank axis in the vicinity of said periphery, and a head at the extremity of the shank spaced from and opposing said work engaging and clamping surfaces for tightening and securing work pieces together therebetween, said head having means associated therewith to facilitate rotating the stud.

2. A rotatable stud fastener in accordance with claim 1, wherein the portion of the shank extending axially beyond said lugs presents a pilot portion which is reduced in diameter toward the entering end of the fastener to facilitate insertion within a complementary work aperture.

FORREST R. SWANSON.

REFERENCES CITED

The following references are of record in the file of this patent:

UNITED STATES PATENTS

| Number | Name | Date |
|---|---|---|
| 1,857,530 | Dandridge et al. | May 10, 1932 |
| 2,152,231 | Yaneson | Mar. 28, 1939 |
| 2,399,181 | Graham | Apr. 30, 1946 |